Oct. 31, 1944.　　　　　L. A. PHILIPP　　　　　2,361,792
REFRIGERATING APPARATUS
Filed Aug. 23, 1940　　11 Sheets-Sheet 1
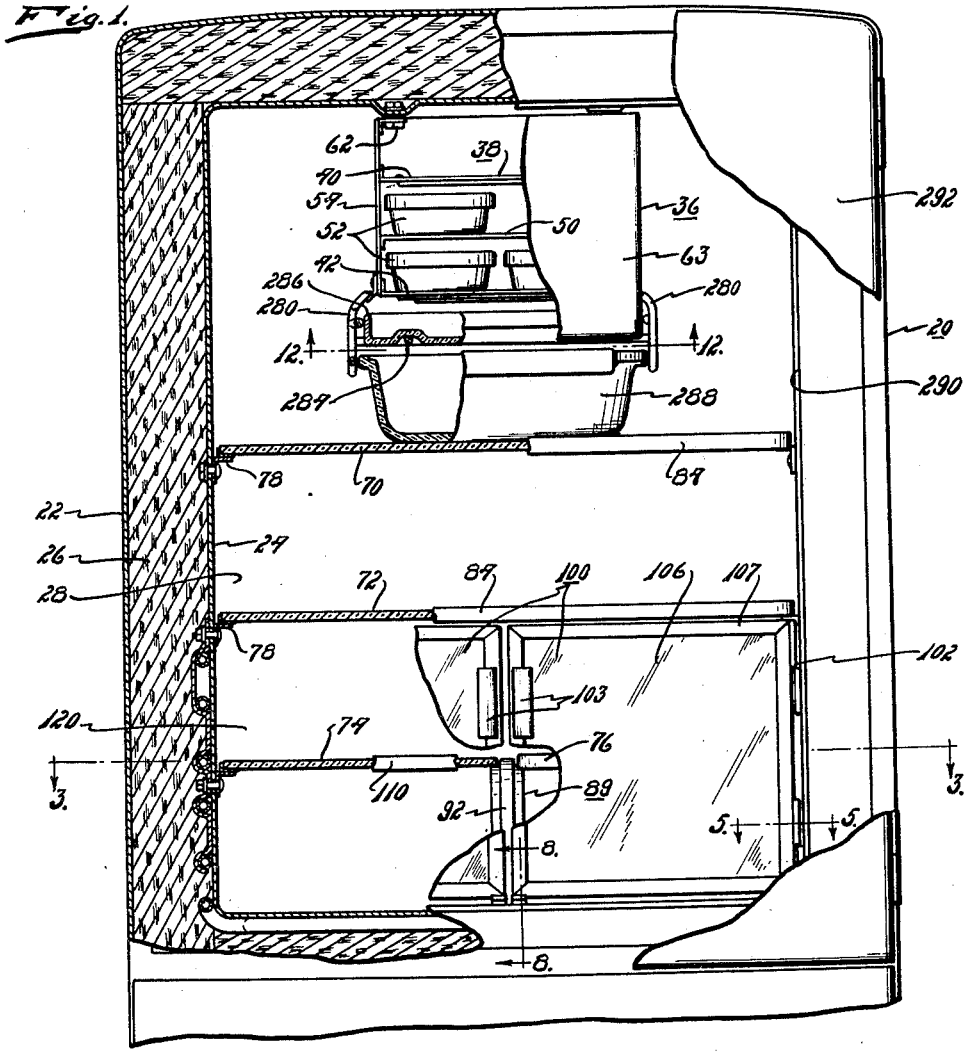
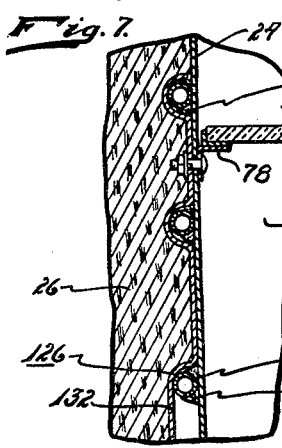 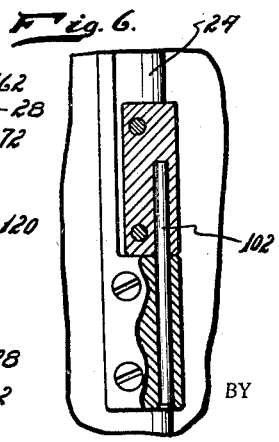 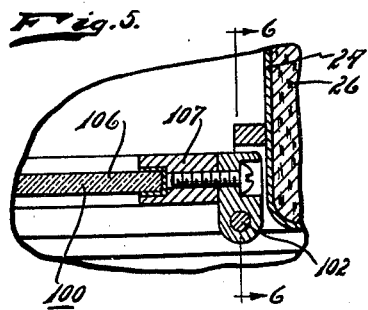
INVENTOR.
LAWRENCE A. PHILIPP
BY Ralph E. Baker
ATTORNEY.

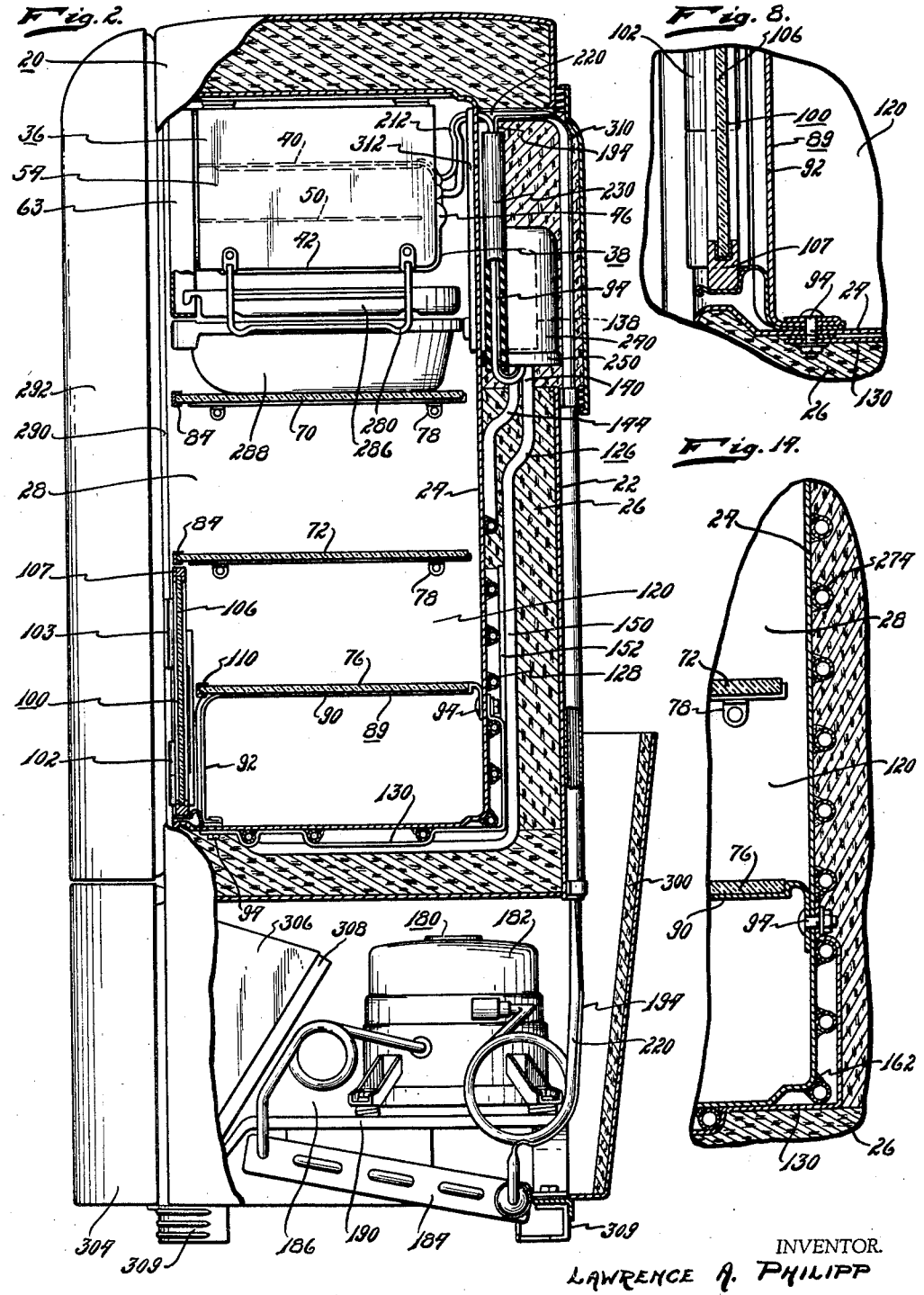

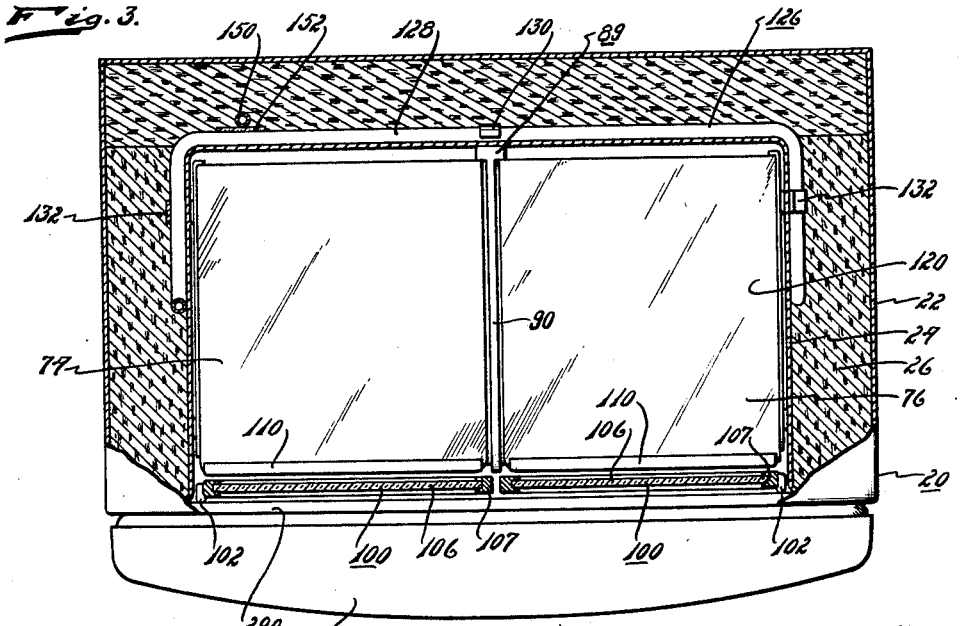
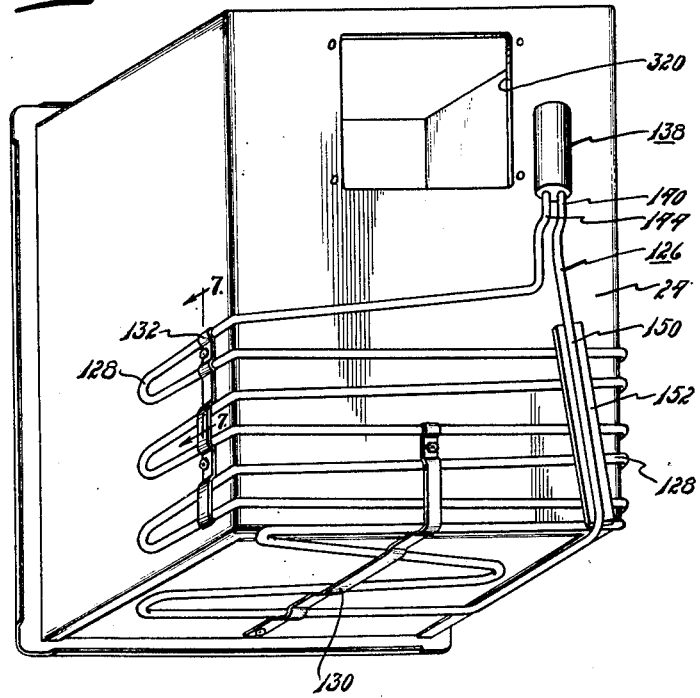
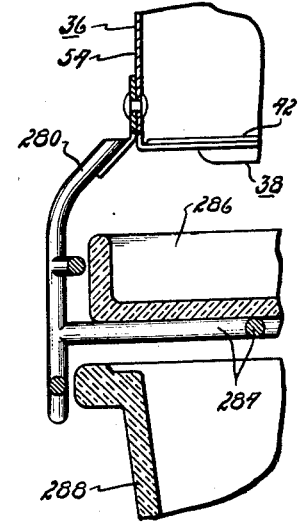

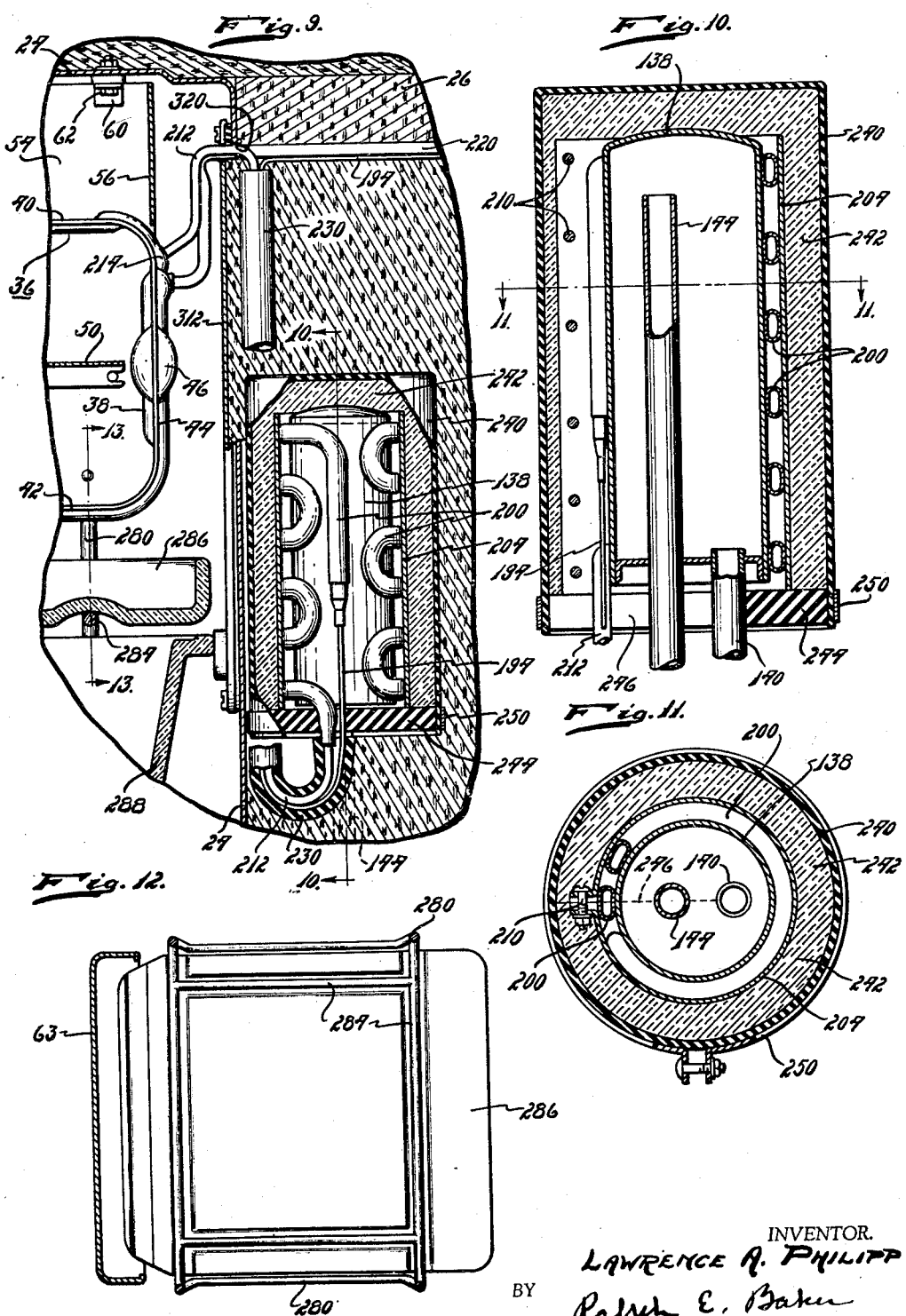

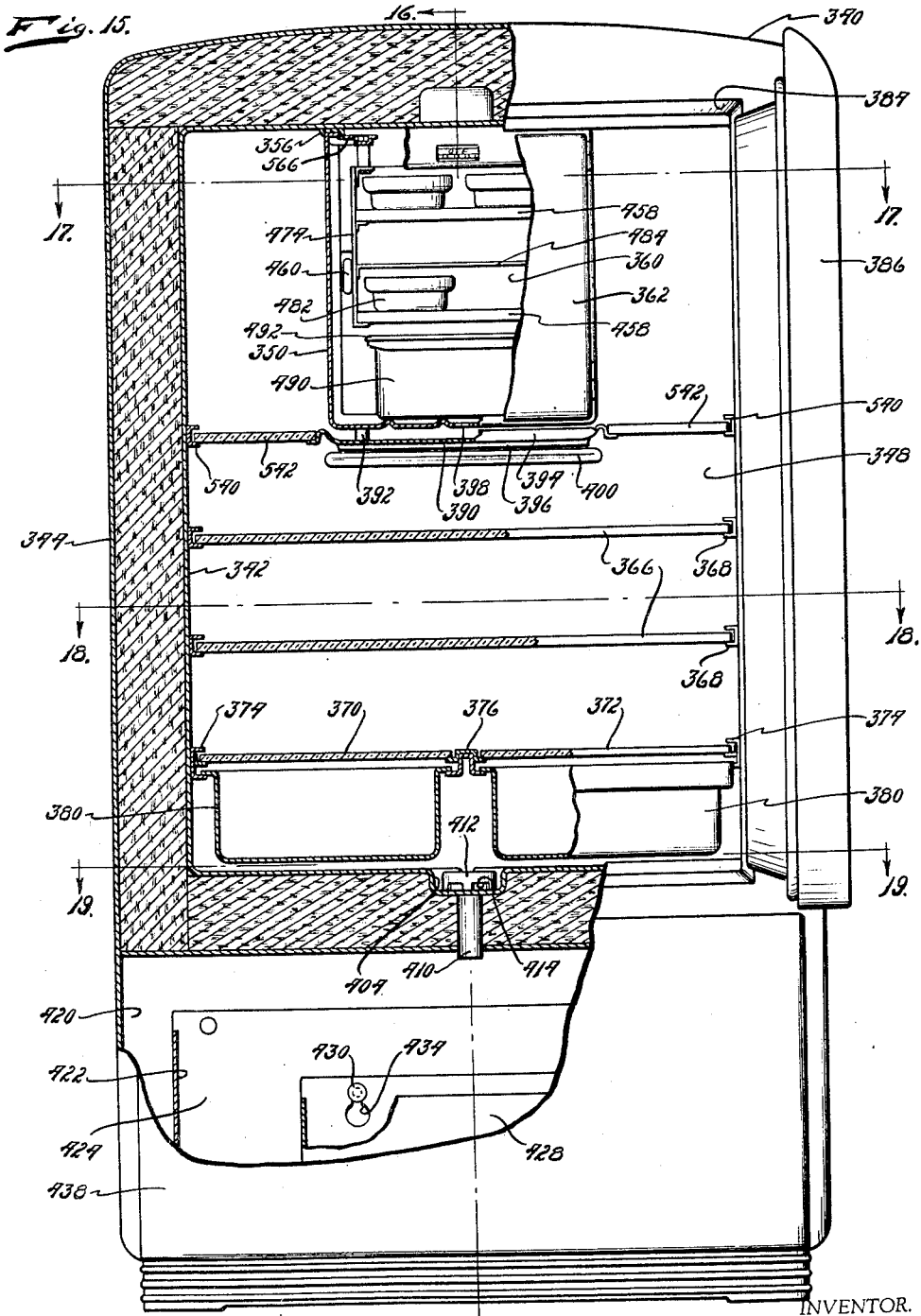

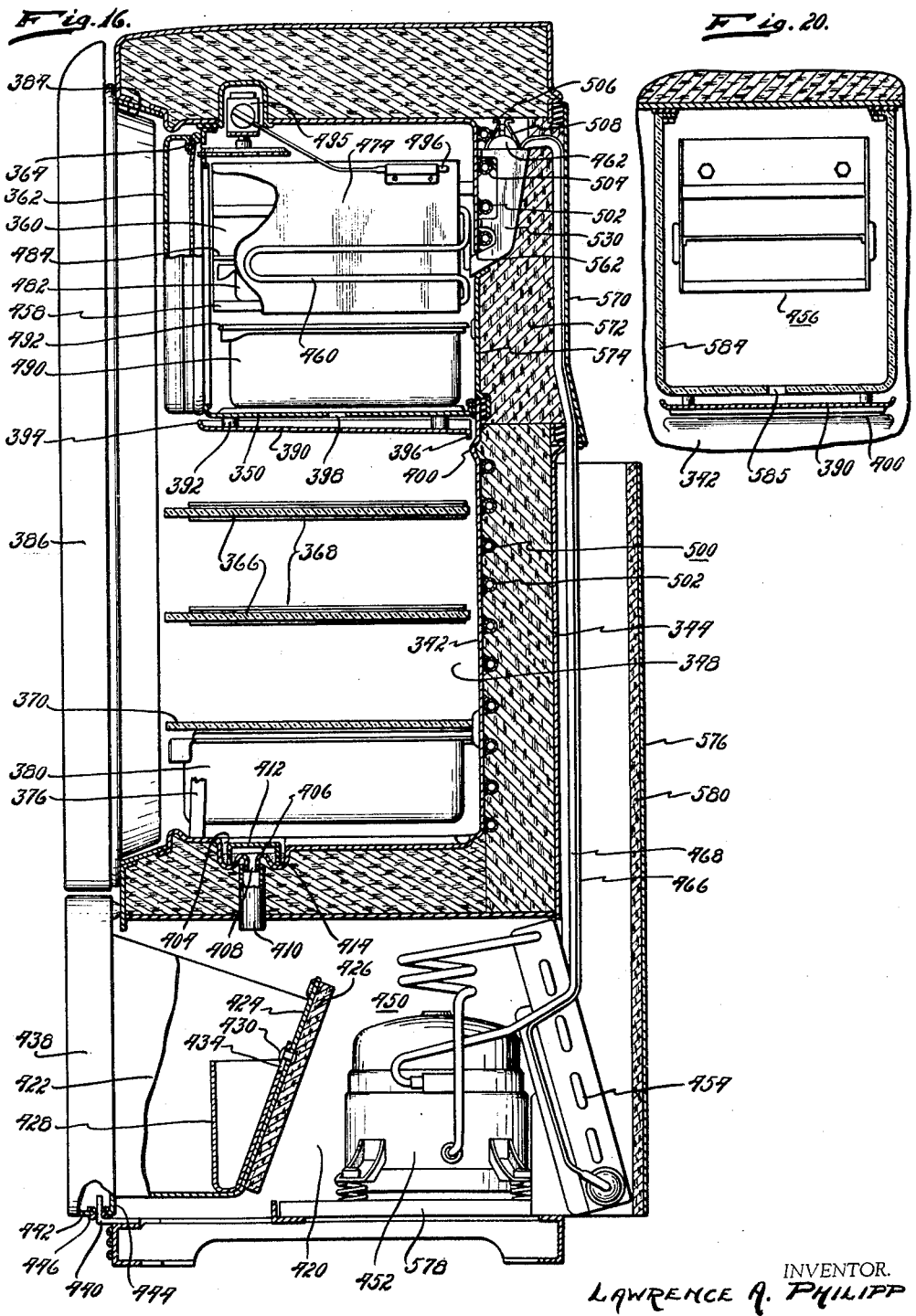

Oct. 31, 1944.  L. A. PHILIPP  2,361,792
REFRIGERATING APPARATUS
Filed Aug. 23, 1940  11 Sheets-Sheet 7
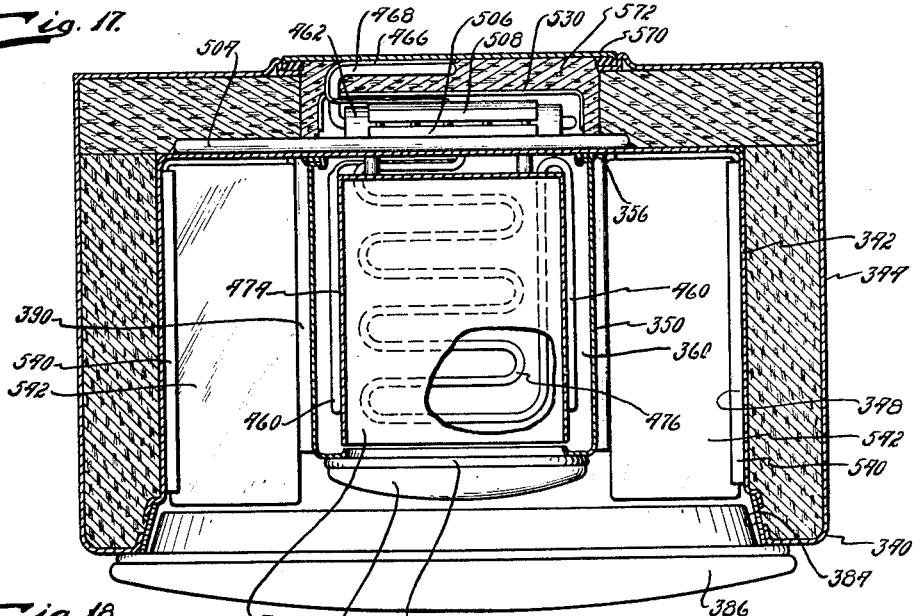
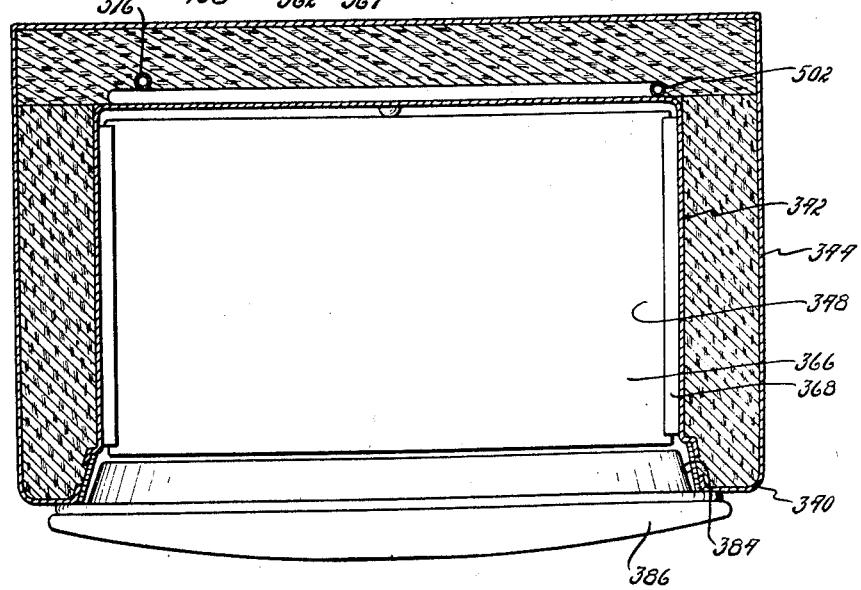
INVENTOR.
LAWRENCE A. PHILIPP
BY Ralph E. Baker
ATTORNEY.

Oct. 31, 1944.   L. A. PHILIPP   2,361,792
REFRIGERATING APPARATUS
Filed Aug. 23, 1940   11 Sheets-Sheet 8
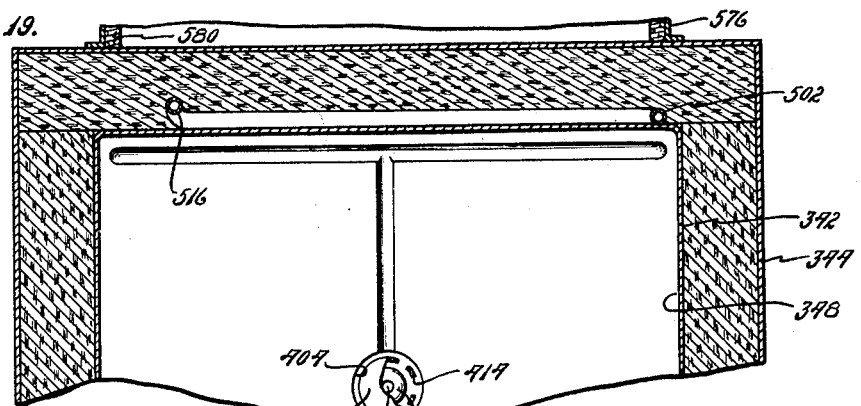
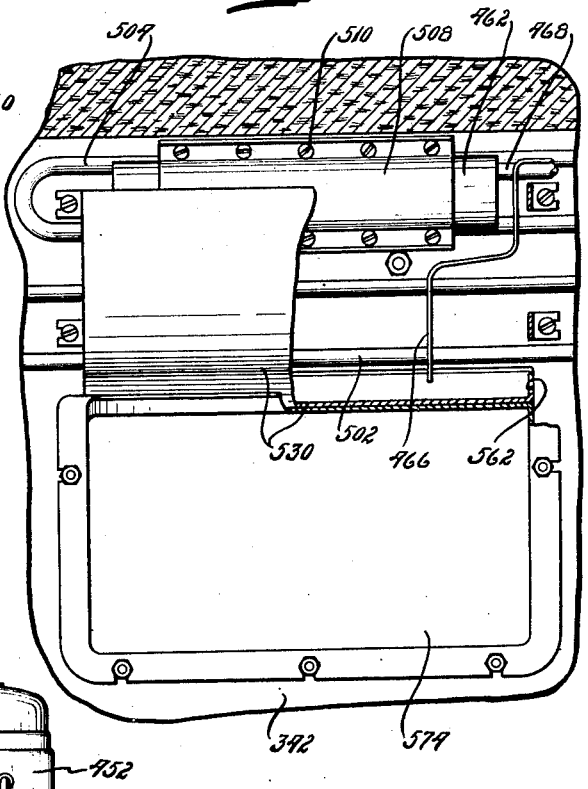
INVENTOR.
LAWRENCE A. PHILIPP
BY
Ralph E. Baker
ATTORNEY.

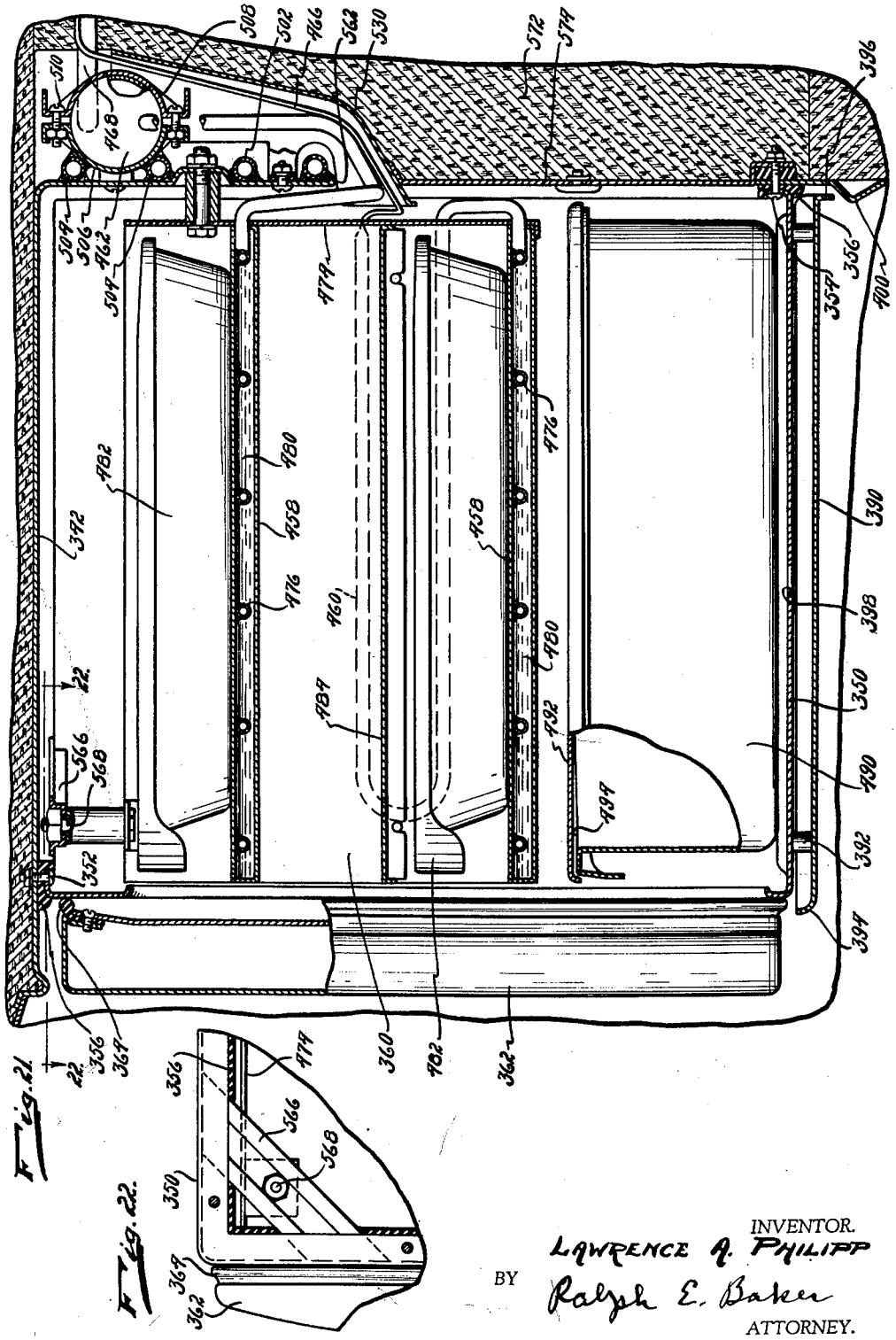

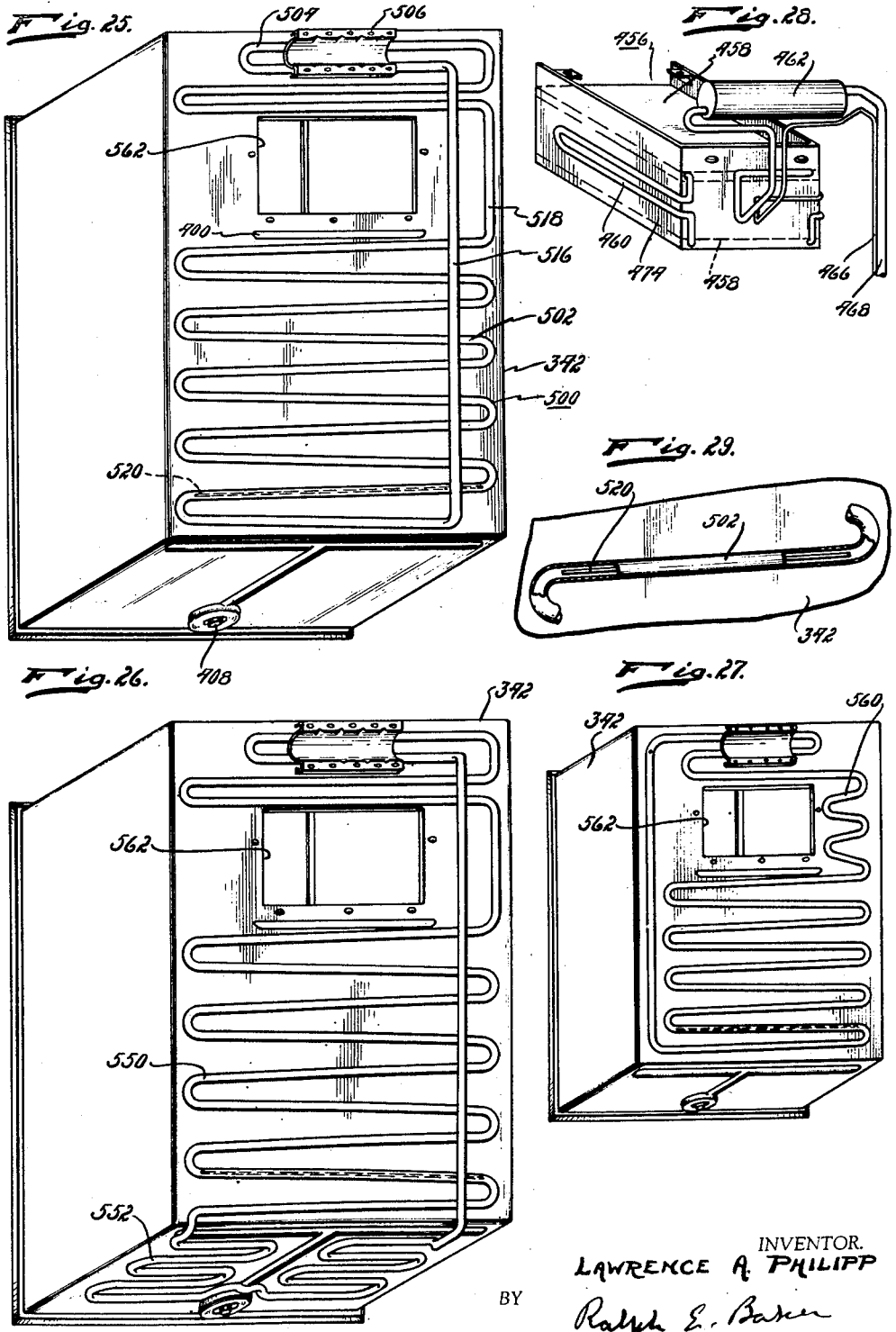

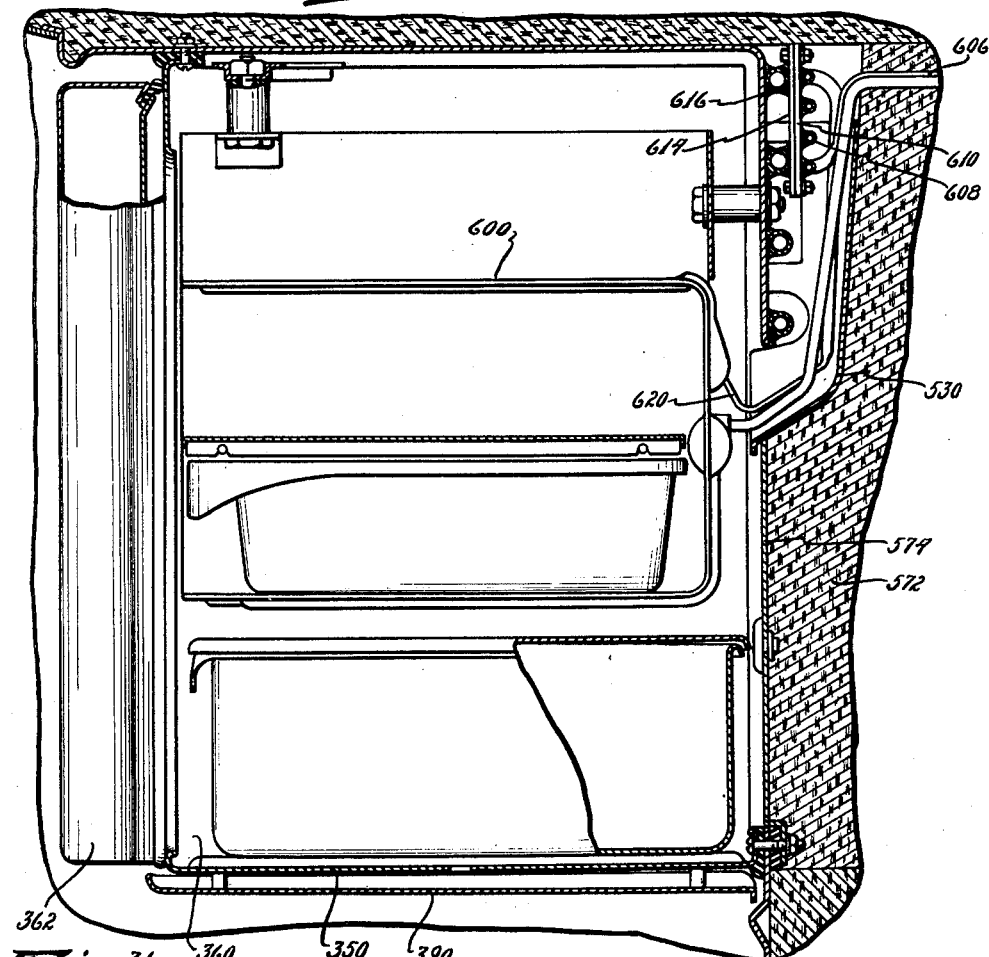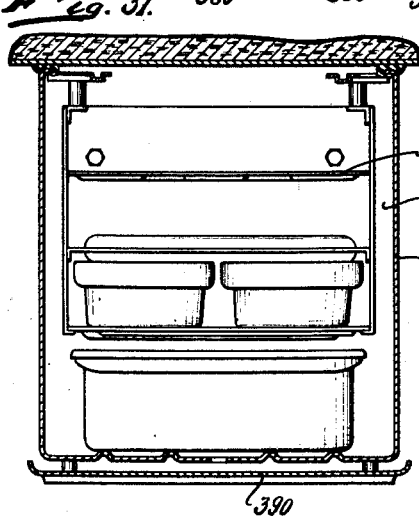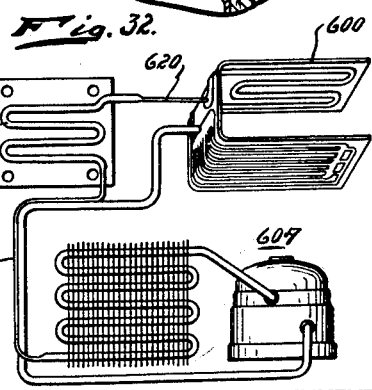

Patented Oct. 31, 1944

2,361,792

UNITED STATES PATENT OFFICE 2,361,792

REFRIGERATING APPARATUS

Lawrence A. Philipp, Detroit, Mich., assignor to Nash Kelvinator Corporation, Detroit, Mich., a corporation of Maryland Application August 23, 1940, Serial No. 353,924

16 Claims. (Cl. 62—89)

This invention relates to refrigerating apparatus, and more particularly to household refrigerators.

One of the objects of my invention is to provide within a refrigerator cabinet an improved arrangement for maintaining a relatively high humidity and low temperature for the preservation of foodstuffs.

Another object of my invention is to provide an improved arrangement within a refrigerator for freezing substances and for cooling a portion of the cabinet to the desired temperature and maintaining the humidity in that portion sufficiently high enough for the preservation of fresh vegetables and the like.

Another object of my invention is to provide within a refrigerator a refrigerant evaporating element which is used primarily for freezing substances and which has insufficient capacity for cooling the entire cabinet to the desired temperature, and to utilize an additional refrigerant evaporating element to aid in cooling a portion of the cabinet to the desired temperature for the preservation of foods and the like, and to maintain one portion of the cabinet so that the circulating air therein is at a relatively high humidity, and to utilize said additional element for cooling that portion of the cabinet wherein a relative high humidity is maintained.

Another object of my invention is to provide within a food storage compartment of a refrigerator a plurality of imperforate shelves vertically spaced apart, and to arrange such shelves so that only a limited amount of circulation of air may be accomplished between said shelves, and to close off a portion of the shelves adjacent their front edges so that when the door of the refrigerator is opened the air within the enclosed space in the food compartment will not flow outwardly or outside air will not enter such space so as to maintain the relative humidity within the space somewhat constant, and to cool said refrigerator in such a manner that said space is maintained at a sufficiently low enough temperature for the preservation of foods and excess moisture from said space is removed therefrom by the refrigerating effect of a low temperature evaporator positioned in another portion of the cabinet.

Another object of my invention is to provide an improved cooling arrangement for a refrigerator cabinet wherein the liner is utilized as a heat absorbing surface throughout its area, and a secondary refrigerant coil is secured to said liner for absorbing heat from the liner in a new and improved manner.

Another object of my invention is to provide in the aforesaid secondary refrigerating system an ebullition initiator for initiating ebullition adjacent the lower portion of said system.

Another object of my invention is to provide a casing within a food storage compartment of a refrigerator which divides the compartment into an ice making zone and an air cooling zone, and to provide for cooling the ice making zone by a primary refrigerant evaporator and for cooling the air cooling zone by a secondary refrigerant evaporator.

In the carrying out of the aforegoing object, it is another object of my invention to make the primary system removable from the refrigerator cabinet so that it may be readily withdrawn from the cabinet and returned to the factory for repairs while the secondary system remains within the cabinet inasmuch as it has no operating parts necessitating repairs.

Another object of my invention is to provide within a refrigerator cabinet a plurality of spaced apart imperforate shelves, preferably made of transparent glass which are slightly spaced from one wall of the compartment so as to provide a fixed path for the circulation of air above, below and between the shelves, and to provide a refrigerant evaporator for cooling the space above the shelves, and to provide an additional refrigerant evaporator for cooling the space within the vicinity of the shelves, preferably through a wall of the food storage compartment without the collection of frost and ice on that wall.

Another object of my invention is to provide a refrigerator cabinet of the type having an inner liner and an outer casing with insulation between the casings, a refrigerant evaporator within the interior of the liner, and a secondary refrigerant evaporator between the liner and the casing in the insulation, and to provide an opening in the liner adjacent both refrigerant evaporators.

It is another object of my invention to connect the condenser of the secondary refrigerating system to the aforementioned refrigerant evaporator positioned between the liner and the outer casing of the refrigerator cabinet.

Another object of my invention is to provide an improved arrangement for draining the drip water from the various refrigerant evaporators to the exterior of the cabinet.

Another object of my invention is to provide within a refrigerator a primary and secondary cooling system including an ice making evaporator which is in the form of refrigerated shelves and is used primarily for freezing of ice with a hold-over portion, so that during periods when the compressor is not operating the hold-over portion will aid in retaining the substances frozen by the refrigerated shelves until the compressor resumes operation, and to utilize a portion of the cooling system for condensing evaporated refrigerant in the condenser of the secondary refrigerating system.

Another object of my invention is to provide a primary system including two spaced apart refrigerant evaporators separated by a pressure differential device, and to utilize one of the said evaporators for condensing evaporated refrigerant in a secondary refrigerating system.

Another object of my invention is to provide an improved arrangement in a machine compartment for creating a natural draft flow of air over heat emitting apparatus, and to arrange the cabinet so that the walls thereof aid in deadening noises transmitted by said heat emitting apparatus.

Further objects and advantages of the present invention will be apparent from the following description, reference being had to the accompanying drawings, wherein a preferred form of the present invention is clearly shown.

In the drawings:

Fig. 1 is a front view partly in elevation and partly broken away of a refrigerator embodying features of my invention;

Fig. 2 is a side view of a refrigerator in elevation and partly broken away showing the invention;

Fig. 3 is a view taken along the line 3—3 of Fig. 1;

Fig. 4 is a rear view in perspective of the refrigerator liner embodying features of my invention;

Fig. 5 is a view taken along the line 5—5 of Fig. 1;

Fig. 6 is a view taken along the line 6—6 of Fig. 5;

Fig. 7 is a view taken along the line 7—7 of Fig. 4;

Fig. 8 is a view taken along the line 8—8 of Fig. 1;

Fig. 9 is a fragmentary view of the rear portion of the ice making refrigerant evaporator in heat exchange relationship between the primary and secondary refrigerating systems;

Fig. 10 is a view taken along the line 10—10 of Fig. 9;

Fig. 11 is a view taken along the line 11—11 of Fig. 10;

Fig. 12 is a view taken along the line 12—12 of Fig. 1;

Fig. 13 is a fragmentary view showing an enlarged view of the supporting structure for the drip pan below the refrigerant evaporating element and the guide members for guiding the cold storage receptacle positioned therebelow;

Fig. 14 is a fragmentary view of a modified form of refrigerated liner and shelf arrangement of the type which is utilized for cooling refrigerators having relatively large food storage spaces;

Fig. 15 is a front view in elevation and partly broken away showing a modified form of refrigerator embodying features of my invention;

Fig. 16 is a view taken along the line 16—16 of Fig. 15;

Fig. 17 is a view taken along line 17—17 of Fig. 15;

Fig. 18 is a view taken along line 18—18 of Fig. 15;

Fig. 19 is a view taken along line 19—19 of Fig. 15;

Fig. 20 is a view of a modified form of casing which is positioned within the food storage compartment for providing an ice freezing zone;

Fig. 21 is an enlarged fragmentary view of the casing positioned within the food storage compartment and ice making evaporating element;

Fig. 22 is a view taken along line 22—22 of Fig. 21;

Fig. 23 is a diagrammatic illustration of a refrigerating system embodying features of my invention;

Fig. 24 is a fragmentary enlarged view showing the refrigerant heat exchange between the primary system and secondary system of the type systems disclosed in Figs. 15 and 16;

Fig. 25 is a rear view of a refrigerated liner embodying features of my invention;

Fig. 26 is a view similar to Fig. 25 showing a modified form of refrigerated liner;

Fig. 27 is a view similar to Figs. 25 and 26 and showing a still further modification of refrigerated liner;

Fig. 28 is a rear view in perspective of a primary refrigerant evaporating element embodying features of my invention;

Fig. 29 is a fragmentary view partly in elevation and partly broken away showing a form of ebullition initiator which is positioned in the secondary evaporating element;

Fig. 30 is a view similar to Fig. 21 showing a modified form of ice making primary evaporating element and modified form of heat exchange connection between primary and secondary systems;

Fig. 31 is a front view of the element shown in Fig. 30; and

Fig. 32 is a diagrammatic view of a refrigerating system used for refrigerating the cabinet shown in Fig. 30.

Referring to the drawings, and particularly to Figs. 1, 2 and 3, there is shown a cabinet, designated in general by the numeral 20. The cabinet includes an outer sheet metal casing 22 and inner sheet metal liner 24. Interposed between the outer casing 22 and the inner liner 24 is insulation 26. As shown this insulation may be in the form of sheet cork, however, any other suitable type of insulation such as fibrous material, "Rock Wool," or the like may be used. The liner 24 is adapted to form on its inner side thereof a food storage compartment 28. Within the food storage compartment I have positioned a refrigerant evaporating element, designated in general by the numeral 36.

The refrigerant evaporating element 36 consists of sheet metal material formed to provide a structure in the general shape of a C, designated by the numeral 38, which constitutes the refrigerant containing walls of the element and includes an upper horizontally positioned shelf 40 and a lower horizontally positioned shelf 42 connected by a perpendicular portion 44 which includes a header 46. Between the upper wall 40 and lower wall 42 I have placed a removable shelf 50. The walls 40 and 42 and the shelf 50 may be utilized for supporting ice making receptacles 52. The side walls are enclosed by sheet metal material 54 which has formed integrally therewith a rear portion 56, see Fig. 9. The side walls, as well as the rear portion 56, extend above the upper wall 40 and secured thereto are brackets 60 which are used for supporting the element 36. The brackets are secured to the top wall of the liner 24 by bolts 62. A door 63 may be used for closing the front of the element. Further details of this type of evaporator may be found in my copending application for Refrigerating apparatus, docket No. 1475, Patent No. 2,325,705, issued August 3, 1943.

Within the food storage compartment I have provided a plurality of vertically spaced shelves 70, 72, 74 and 76. Shelves 70 and 72 are of the same size and shape and are preferably constructed of transparent glass so as to provide transparent imperforate shelf structures. These shelves are supported by brackets 78 carried by the liner 24. As shown, these shelves extend substantially from one side of the liner to the other and from substantially the front part of the food storage compartment to a point adjacent the rear wall of the liner to provide a space at the rear of each shelf between the rear edges of the shelves and the rear wall of the liner so as to permit limiting circulation of air through said spaces. If desired, these shelves may be constructed of sheet metal, plastics or other materials. When the shelves are constructed of glass I propose to provide an angular metal strip 84 along the front edges so as to protect the front edge of the shelf against breakage by contact therewith upon placing foodstuffs in the refrigerator. The shelves 74 and 76 cooperate to form one continuous shelf since they are mounted with their inner side edges adjacent each other. However, they are formed of two pieces of material, such, for example, as glass, plastic or metal to form imperforate shelf structures, and like shelves 70 and 72 extend to the side walls of the liner and to a point adjacent the front of the liner and are spaced at their rear edges from the rear wall of the liner to provide spaces for the circulation of air between the rear edges and the rear wall of the liner. The inner edges of the shelves 74 and 76 are supported by a bracket 89 which has a horizontal portion 90 and vertical portion 92. The vertical portion 92 is secured by bolts 94 to the bottom wall of the liner, and the horizontal portion 90 is secured by bolts 94 to the rear wall of the liner. The lower portion of the front part of the cabinet is closed by doors 100. These doors are hinged as at 102 and have handles 103. Preferably, the doors 100 like shelves 74, 76, 70 and 72 are constructed of transparent glass so that the foodstuffs stored therebehind may be readily visualized from the front of the cabinet. The doors 100 include the transparent glass sections 106 and metallic trim 107 which surrounds the plate glass. Shelves 74 and 76 may be provided with angular metal members 110 about their forward edges so as to eliminate chipping of the glass. I have found that by making shelves 74 and 76 of lesser width than the shelves 70 and 72 and supporting them upon their inner edges that I am able to store large food articles below the shelf 72. This is accomplished by simply removing shelf 74 or shelf 76 and such large articles may be inserted below shelf 72. If desired, the shelf 74 may be removed and placed on top of the shelf 76 thereby providing a relatively large compartment below the shelf 72 for the storage of large food articles. The shelf 72 together with the doors 100 provide what is herein termed as high humidity compartment, designated in general by the numeral 120. This compartment includes the space above as well as the space below the shelves 74 and 76.

In order to cool the high humidity compartment 120, I have provided a secondary refrigerating system, designated in general by the numeral 126. The system includes an evaporator 128 which is in the form of a serpentine coil and is secured to the bottom wall of the liner by means of bracket 130 and is also secured to the rear wall of the liner and the lower rear portions only of the sides of the liner. The evaporator 128 is secured to the lower rear portion of the liner sides by brackets 132, see Fig. 4. The evaporator is operatively connected to a condenser 138. The condenser consists of a tank which is in open communication with both ends of the evaporator. One end 140 of the evaporator is positioned adjacent the lower portion of the tank 138 and the outlet end 144 of the evaporator is positioned near the upper end of the tank 138. By this arrangement liquid refrigerant which is condensed in the tank 138 enters end 140 of the evaporator whence it flows through the serpentine passage formed by the evaporator and the evaporated refrigerant passes out the outlet end 144 into the tank 138 to be condensed. The inlet end 140 of the evaporator 128 includes a vertically extending portion 150 which passes over portions of the evaporator secured to the rear wall of the liner. To prevent the transfer of heat from the leg 150 to the horizontally extending portions on the rear wall of the liner, I have placed a piece of insulating material 152. The secondary evaporator 128, in addition to being secured to the liner by brackets 130 and 132, is also secured thereto by a coating of "Hydrolene" 162 to insure good contact between evaporator 128 and the liner 24. Any other form of bituminous cement may be used for securing the evaporator 128 to the liner 24. The evaporator 128 is adapted to absorb heat from the circulating air in the high humidity compartment 120 by absorbing the heat through the liner 24 and is adapted to so cool the compartment 120 without the collection of frost on the liner.

Liquid refrigerant is delivered to the evaporating element 36 by a refrigerant liquifying and condensing element 180. The element 180 includes motor compressor unit 182 and condenser 184. The element 180 is disposed within a machine compartment 186 which is open at the rear thereof and at the bottom thereof. The motor compressor unit and condenser 184 are secured to and carried by base 190. The condenser is horizontally positioned on a slight angle below the motor compressor unit. The condensing element 180 delivers liquid refrigerant to the evaporator element 36 through a small diameter or capillary tube 194. This tube constitutes the sole control device for controlling the flow of liquid refrigerant to the evaporating element. Before the refrigerant leaving the small diameter tube 194 enters the evaporating element 36 it passes through a refrigerant evaporating or heat exchange portion 200. This portion 200 is wrapped around the tank 138 and is held in good thermal contact therewith by means of a clamped sleeve 204 which surrounds the evaporating portion 200 and clamps it to the tank 138. The clamping sleeve is wrapped around the evaporating portion 200 and clamped together on its ends by bolts 210. The portion 200 and tank 138 are positioned in the insulation between the inner liner and the outer casing. The refrigerant after leaving the evaporating portion 200 then passes through conduit 212 into an inlet 214 of the evaporating element 36. Evaporated refrigerant is withdrawn from the evaporating element into a vapor return conduit 220. The vapor return conduit is placed in heat exchange relation with the small diameter tube 194 where the cool gases in the return conduit 220 cool the conduit so that it tends to cool the liquid refrigerant passing through the conduit 194. The conduit 194 and inlet conduit 212 are preferably covered by a tube of soft rubber insulating material 230 so as to prevent the formation of moisture within the insulation of the cabinet. The clamping sleeve 204 is covered by a rubber enclosure 240 and insulation 242 inside the cover 240 which insulation surrounds the sleeve 204. At the lower portion of the clamping sleeve 204 is a rubber disc 244 which is split as at 246 for receiving conduits 140 and 144 as well as conduits 194 and 220. The rubber cover 240 is secured to the disc 244 by clamp 250. Preferably, the disc 244 is sealed at 246 where it is split, by sealing material, such, for example, as "Permagum." Likewise "Permagum" may be used around the peripheral edge of the disc 244 to seal it to the rubber cover 240. Thus, an air tight seal is provided around the tank 138 and evaporating portion 200 so as to prevent the collection of moisture upon the cold surfaces thereof to thus prevent any likelihood of moisture getting into the insulation at times when the system is not operating.

As shown in Figs. 1 and 2, the secondary refrigerant evaporating element extends upwardly on the liner to a point about the heighth of the shelf 72 and doors 100. This evaporating element is used primarily for cooling the high humidity compartment 120. In Fig. 14 I have shown a secondary refrigerant evaporating element 274 which corresponds to the refrigerant evaporating element 128, however, it extends upwardly a substantial distance above the shelf 72. This particular arrangement is desirable for cooling cabinets which have large food storage spaces and additional cooling is necessary between the top of the high humidity compartment and the evaporating element 36. Also, it may be found desirable to extend this secondary refrigerant evaporator on the liner somewhat above the high humidity compartment under certain circumstances.

Carried by the sheet metal material 54 of element 36 are depending U-shaped members 280 on each side of the element. These members include cross wires 284 which are utilized for supporting drip pan 286 immediately below the evaporator. The U-shaped members extend downwardly below the cross wires 284 and provide guides for guiding the receptacle 288 when it is positioned beneath the element 36. Preferably, the receptacle 288 is positioned on shelf 70 and is used for the storage of certain foods of which it is desired to maintain a slightly lower temperature than other foods positioned in the compartment 28. The cabinet 20 is provided with a door opening 290 at the front end thereof which is closed by a door 292. It will thus be noted that when the door 292 is opened the doors 100 will prevent air within the high humidity compartment 120 from leaving that compartment and also prevent outside air from entering the compartment 120.

The operation of the system is as follows. Gaseous refrigerant is withdrawn from the refrigerant evaporating element 36 through vapor return conduit 220 whence it passes to the motor compressor unit 182 which compresses it and delivers it to the condenser 184. The refrigerant is liquified in the condenser 184 and delivered to the evaporating element under the control of small diameter tube 194. Any suitable control device (not shown), such as a thermostatic element responsive to changes in temperature of the evaporating element 36 or sheet metal side walls 55 thereof, may be used for controlling the operation of the motor compressor unit. Preferably, the evaporating element 36 is operated at sufficiently low temperatures for freezing ice upon the shelf portions 40 and 42 and in the receptacles 52 supported by the removable shelf 50. After the liquid refrigerant passes through the evaporating portion 200 which surrounds the tank or secondary condenser 138, the cooling effect of the refrigerant evaporating in the portion 200 liquifies gaseous refrigerant in the tank 138. The liquified refrigerant then flows down into the secondary refrigerant evaporator 128 and as it gasifies passes through the outlet end 144 into the tank 138 where it is again liquified. Preferably, the evaporating portion 200 is of such area as to cause the tank 138 to serve its condensing function in such a manner that the evaporator 128 operates at sufficiently low enough temperature to properly cool the compartment 120 to the desired temperature for preserving foodstuffs stored therein. However, due to size of portion 200 and due to the "Hydrolene" around the evaporator 128 and the contact with the liner where the evaporator is secured thereto, the liner absorbs heat from the compartment 120 without the collection of frost or ice upon the inner walls of the liner 24. By dividing off the compartment 120 so as to provide a high humidity compartment and cooling same by secondary refrigerant by the evaporator 128, I have found that it is possible to store fresh vegetables in the compartment 120 where they will be kept in fresh condition for long periods of time. It has been found that by the arrangement disclosed herein the compartment 120 serves to maintain a very high relative humidity and is of such high value that the vegetables retain their original crispiness over long periods of time. In the event, however, that too much moisture should form in the compartment 120 on very humid days, such moisture would collect on the rear wall of the liner and tend to flow to the bottom wall of the liner. For this reason I have spaced the rear edges of the shelves 71, 72, 74 and 76 from the rear wall of the liner to allow for the circulation of air between the rear edges of the shelf and the rear wall of the liner so that air circulating upwardly which comes in contact with the refrigerant evaporating element 36 will freeze out such excess moisture on the surfaces of the refrigerant evaporating element and prevent the accumulation of excess moisture upon the bottom wall of the refrigerant liner. As shown, the refrigerant evaporating element 36 has a refrigerant containing bottom wall and rear wall only exposed to the circulating air within the food storage compartment 28. In addition, the drip pan 286 is positioned immediately below the bottom wall 42 of the element 36 which prevents, to a certain extent, contact of the circulating air with the bottom wall of the evaporating element. Under these conditions, the refrigerant evaporating element has exposed to the circulating air less refrigerant containing area than is necessary for cooling all of the air in the food storage compartment. For this reason I have provided the secondary refrigerant evaporator 128 to aid in cooling the food storage compartment and particularly the compartment 120. In actual practice I have found that the temperature in the humid compartment 120 is somewhat lower than the temperature immediately above compartment 120 because of the small effective area of the refrigerant evaporating element 36. Under these conditions the fresh vegetables and the like stored within the high humidity compartment will not lose their moisture by diffusion, because the compartment 120 is lower in temperature than the temperature of the food storage compartment immediately above the shelf 72.

At the rear of the cabinet adjacent the machine compartment, I have provided a sound insulating flue 300. Directly opposite the flue 300 and at the front of the machine compartment I have provided a door 304 which carries a vegetable bin 306. On the rear wall of the vegetable bin 306 I have provided a slab of insulating material 308 which has sound absorbing characteristics. Preferably, the slab of insulating material and vegetable bin extend substantially from one side wall to the other of the machine compartment. As will be noted, the slab of insulating material tilts so that the upper end thereof is closer to the motor compressor unit than the lower end thereof. By this arrangement air enters the lower part of the cabinet about the cabinet base 309 and passes over the condenser and through the motor compressor unit and out the flue up the rear of the cabinet. Since the slab of insulating material 308 is tilted it tends to cause the air to flow toward the motor compressor unit and flue 300. Since the flue 300 is provided of sound insulating material and the slab of insulating material 308 carried by the vegetable bin is constructed of sound insulating material, noises transmitted by the motor compressor unit are absorbed by such insulating material.

Preferably, the evaporating element 36 and condensing element 180 which constitute the primary refrigerating system are removed from the cabinet as a unitary structure without disconnecting the conduits 194 and 220 when it is desired to remove the primary refrigerating system from the cabinet for repairs. The secondary refrigerating system remains within the cabinet as it is unnecessary to remove same as it includes no operating parts necessitating repairs. When it is desired to remove the primary refrigerating system, which includes the evaporating element 36 and condensing element 180, all that is necessary is to remove the flue from the cabinet, disconnect the evaporating portion 200 from the secondary condenser or tank 138 and then remove removable panel 310 on the rear of the cabinet at the back of the evaporating element 36 and removable panel 312 adjacent the rear of the evaporating element 36. The panel 310 is first removed and then the insulation material adjacent the panel 310 is removed. The liner 24 is provided with an opening 320 in its rear wall which is closed by the panel 312.

In Figs. 15 and 16 I have shown a modified form of refrigerator. In these figures the numeral 340 designates in general a cabinet having inner metallic liner 342 and an outer metallic casing 344. The inner metallic liner 342 forms walls of food storage compartment 348. Within the food storage compartment 348 is placed a sheet metal casing 350 which is secured to top wall of the liner 342 by bolts 352, see Fig. 21, and to the rear wall of the liner by bolts 354. Interposed between the casing 350 and the liner is provided gasket material 356 for sealing the terminating edges of the casing 350 to the top and rear walls of the liner 342 so that circulating air within the food storage compartment is sealed from the interior of the casing 350 and serves to form an ice freezing zone 360. The front of the zone 360 is closed by a hinged door 362 which is of double wall structure and carries a gasket 364, see Fig. 22, which engages with the front wall of the casing 350 to seal the open front of the casing so that circulating air within the food storage compartment cannot enter the ice freezing zone through the open front of the casing 350. Within the food storage compartment I have provided a plurality of vertically spaced apart imperforate shelves 366, which are preferably constructed of transparent glass but may if desired be constructed of metal, plastic or other suitable material. These shelves are carried by brackets 368 supported by side walls of the liner 342. Immediately below the shelves 366 are shelves 370 and 372 which are supported on side walls of the liner by brackets 374 and by bracket 376 which has a portion secured to the rear wall of the liner and a portion secured to the bottom wall of the liner. The shelves 370 and 372 may be constructed of any of the materials of which the shelves 366 are constructed, preferably transparent glass. The shelves 370 and 372 after being placed in position as shown in Fig. 15 constitute a single shelf, however, either of the shelves may be removed and placed on top of the other so that a higher space is provided below the lowermost shelf 366. Immediately below the shelves 370 and 372 are suspended receptacles 380 so that they may be freely slid into and out of the refrigerator. The receptacles 380 are used to keep vegetables in a fresh condition. Likewise the shelves 370 and 372 may be easily slid into and out of the refrigerator or may be lifted upwardly as is readily apparent from the drawings. In the forward part of the cabinet there is provided a door opening 384 which is closed by hinged door 386. As will be noted, the glass shelves are spaced slightly from the door and slightly from the rear wall of the liner but extend substantially from side wall to side wall. The slight spacing of the glass shelves from the door and from the rear wall of the liner provide fixed dimensions for spacing to allow for limiting circulation of the air between spaces for the purpose hereinafter described.

Also, within the food storage compartment, I have provided a drip receiver 390 which is in the form of a shallow pan and is carried by the casing 350 by supports 392. The drip receiver has an upturned edge 394 at its forward end and a downturned edge 396 at the rear thereof. The drip receiver 390 is positioned so as to collect drip water from the casing 350 which may run down its exterior surfaces, and also for collecting drip water which may run through opening 398 formed in the bottom wall of the casing 350. The downturned edge 392 of the drip receiver extends over a protuberance 400 formed in the rear wall of the liner so that the drip water passing from the receiver 390 will contact the protuberance and then run down the rear wall of the liner to the bottom wall thereof. Within the bottom wall of the liner I have formed a recess 404 which has upturned bent portion 406 and an outlet 408 formed therein. Below the outlet 408 is a drain pipe 410. Above the upturned portion 406 is inverted cup 412 having slots 414 so that the drip water may run under the cup and thus form a trap thereunder so that air from outside the cabinet may not enter the interior of the refrigerator through the pipe 410 and outlet 408. Also, the cup 412 prevents possibility of food articles passing through the drain pipe 412.

Below the food storage compartment there is provided a compartment 420. Within the machine compartment there is provided a vegetable bin 422 which has an inclined rear wall 424 to which is secured sound insulating material and heat insulating material 426. While such material as shown herein is shown as cork insulation, any suitable sound absorbing and heat insulating fibrous material, "Rock Wool," or the like, may be used. Upon the forward edge of the inclined wall 424 I have provided a removable drip pan 428 which is carried by rivets 430 and the pan is readily removable therefrom, by simply sliding upwardly on the inclined surface 424 until an enlarged slot 434 surrounds the head of the rivet 430 and then the removable receptacle 428 may be moved forward slightly to clear the head of the rivet and then lifted upwardly to be removed from the vegetable bin. The drip receptacle 428 is positioned below the drain pipe 410 to receive the drip water from the pipe 410. The vegetable bin is carried by a tiltable door 438 which closes the front end of the machine compartment. The door 438 rests upon an L-shaped member 440 and the door includes an outer wall 442 and an inner wall 444. These walls have on their lower edges flanges which extend toward each other and which carry rubber gasket material 446. The rubber gasket material engages the L-shaped support and allows the upper part of the door to be tilted outwardly to gain access to the vegetable bin to place vegetables therein or to remove the drip receptacle as desired. Since the rear wall 424 of the vegetable bin is insulated, the heat of condensation does not tend to evaporate water collected in the receptacle 428 and it is found necessary to periodically empty such receptacle.

Within the cabinet I have provided a refrigerating system of the type diagrammatically shown in Fig. 23. The system includes a condensing element 450 which includes a motor compressor unit 452 and condenser 454. The system also includes a refrigerant evaporating element 456 which includes refrigerated shelves 458 and pipe loops 460. At the outlet of the element 456 is a refrigerant accumulator 462. Liquid refrigerant is delivered from the condensing element to the evaporating element through a small diameter or capillary tube 466, and vaporized refrigerant is returned from the accumulator 462 through vapor return conduit 468. The gaseous refrigerant returned through the conduit 468 to the compressor unit is compressed by it and delivered to the condenser element to be liquified and from which it is delivered to the evaporating element under the control of the small diameter tube 466. Preferably, the small diameter tube 466 and vapor return conduit 468 are securely united together in heat exchange relationship. The refrigerant entering the evaporating element first passes through one leg of the return bends 460 whence it flows through the lower refrigerated shelf to the second leg of the return bends 460 whence it passes through the upper refrigerated shelf and a small quantity of liquid is allowed to enter the lower portion of the accumulator 462. The vapor return conduit is preferably connected to the upper end of the accumulator so that, only gaseous refrigerant may be returned to the compressor unit. As shown in Figs. 16, 17 and 21, the return bends 460 are secured to side walls of the sheet metal member 474 which extends up each side of the refrigerated shelves 458 and somewhat thereabove and across the rear of the refrigerated shelves. The refrigerated shelves include refrigerant evaporating conduits 476 which are connected in series with the return bends 460 and are secured to the bottom of the upper wall of the shelves 458. The bottom wall of the shelves 458 is spaced from the upper wall to provide a space for holdover portion 480, which may be brine or eutectic as desired. The refrigerated shelves provide supports for ice making receptacles 482. Between the shelves 458 and carried by the sheet metal member 474 is removable shelf 484, which also provides a support for the ice making receptacle. The refrigerant evaporating element 456 is utilized primarily for the freezing of substances and is spaced somewhat from the walls of the casing 350 so that it cools the walls of the casing 350 slightly so that whatever cooling effect it may have for the cooling of circulating air within the food storage compartment 348 takes place without the formation of frost or ice on the exterior surfaces of the casing 350. The hold-over portion associated with the refrigerated shelves 458 may be omitted if desired, however, it has a tendency to aid in retaining ice frozen in the receptacles 482 in a frozen condition even though the cycles of operation of the motor compressor are intermittently performed over long periods of time, that is, the compressor may be inoperative for a long period of time between cycles and the hold-over solution will aid in keeping the ice in receptacles 482 in a frozen condition. Below the lowermost refrigerated shelf 458 is a space for a receptacle 490 which is suitable for storage of meats in that the temperature inside the receptacle is retained at slightly above the freezing point of water. The receptacle 490 is provided with a lid 492 which is slightly spaced from the receptacle 490 at its ends as at 494 to ventilate the interior of the receptacle. A switch 495 which includes thermal bulb 496, see Fig. 16, secured to member 474 is used for controlling the operation of the motor compressor unit in response to changes in temperature of member 474 as is well understood in the art.

Also, for cooling the food storage compartment, I have provided a secondary refrigerating system, designated in general by the numeral 500 and, as shown in Fig. 25, includes an evaporating portion 502 secured to the rear wall of the liner only. The system also includes a condensing portion 504 which is secured to the rear wall of the liner at the upper portion thereof and has secured thereto a semi-circular shell 506 which receives half of the accumulator 462. Another semi-circular shell 508 is clamped to the condensing portion 504 by bolts 510 and clamps the accumulator firmly in engagement with the shell 506. Since the shell 506 is secured to the condensing section 504 and system 500, preferably by welding as at 52, the accumulator may be in good thermal contact with the condensing portion 504 and an accumulator is utilized for condensing evaporator refrigerant in the secondary system. Evaporated refrigerant which is condensed by the refrigerating effect of the accumulator flows downwardly through vertical leg 516 to the lowermost part of the evaporator 502 whence it flows upwardly in the evaporator and after it is vaporized it passes upwardly through vertical leg 518 to the upper portion of the condenser 504. Within the lower part of the evaporator 502, I have provided an ebullition initiator 520 to aid in promoting the ebullition of refrigerant promptly in the lower part of the evaporator 502. The accumulator and secondary refrigerating system is placed within the insulation between the rear wall of the liner and the rear wall of the outer casing.

Immediately below the accumulator I have provided a trough 530 which extends through an opening 532 in the rear wall of the liner. This permits ventilation between the insulation and the ice freezing evaporating element so that if there is any moisture in the air within the insulation it will be frozen out upon the accumulator or passed with the air to the ice making element and frozen on surfaces of the ice making element. When it is desired to defrost the refrigerant evaporating element 456, frost also melts from the accumulator if any is accumulated thereon. This drip water would then flow through the trough 530 down to the bottom wall of the casing 350 and through the opening 398 in the bottom wall of the casing to the drip receiver 390 whence it passes to the protuberance 400 formed in the rear wall of the liner and down to the bottom wall of the liner and through the drain 410. The secondary refrigerant evaporator 402 is secured to the rear wall of the liner, preferably by a coating of "Hydrolene," however, any other bituminous cement may be used for that purpose. Preferably, the heat exchange relation between the accumulator and the secondary condenser is such and the coating of "Hydrolene" between the evaporator 502 and the rear wall of the liner is such, that the secondary refrigerant evaporator functions to cool the food storage compartment through the rear wall of the liner without the collection of frost upon the rear wall of the liner. Since there is very little circulation of air in the food storage compartment, by reason of the fact that imperforate shelves are utilized, a relatively high humidity is maintained below the drip receiver 390 and below each of the shelves 366, 370 and 372. This prevents the drying out of foodstuffs stored in the food storage compartment 348. On opposite sides of the drip receiver 390 and supported thereby by brackets 540 carried by wall of the liner 342 are small transparent glass or other type of imperforate shelves 542 supported on each side of the drip receiver 390 so as to form therewith an imperforate structure extending across from side wall to side wall of the food storage compartment. The walls of the casing 350 tend to cool the space above the shelves 542 somewhat and a portion of the secondary system which extends thereabove aids in cooling the said space. In Fig. 26 I have shown a modified form of secondary refrigerating system which includes evaporator structure 550 which is similar to the secondary refrigerant evaporator 502 but that it includes a portion 552 formed in serpentine relation and secured to the exterior surface of the bottom wall of the liner. In Fig. 27 I have shown a secondary refrigerating system secured to the rear wall only of the liner 342 and this differs in that it has a serpentine coil section 560 adjacent an opening 562 in the rear wall of the liner 342. Preferably, the sheet metal member 474 is supported by the casing 350 by metallic brackets 566 carried by the casing and bolts 568 so that the refrigerant evaporating element 456 may be readily removed from the casing. The evaporating element may also be readily removed from the refrigerator cabinet without disconnecting the refrigerant conduits 466 and 468, by simply removing removable panel 570 on the rear wall of the cabinet insulation 572 and removable panel 574. The insulation 572 may be split where conduits 466 and 468 enter cabinet so that it may be removed in two halves or it may be made of loose fibrous material so it can be readily removed. The evaporating element may then be removed from the cabinet through opening 562 in liner 342. Likewise the refrigerant condensing element 450 may be removed by simply removing the flue 576 on the rear of the cabinet. The condensing element 450 is positioned on a base 578 in the machine compartment 420 and condenser 454 is angularly positioned to the rear of the compressor unit 452, with its lower portion positioned in the lowermost portion of the flue and its upper portion partly within the machine compartment. The flue 576 includes a slab of sound insulating and absorbing material 580 which material may be the same as sound insulating and absorbing material 426. These slabs of sound insulating material absorb noises transmitted by the motor compressor unit. When the flue 576 is removed the motor compressor unit may be readily removed from the machine compartment without disconnecting the refrigerant conduits 466 and 468. Consequently, the entire primary refrigerating system, which includes the refrigerant evaporating element 456 and the condensing element 450, may be removed from the cabinet as a unit without disconnecting the refrigerant conduits which interconnect these units. The vegetable bin shown in Figs. 1, 2 and 3 may be mounted in the cabinet in substantially the same manner as vegetable bin 422 is mounted in the cabinet shown in Fig. 16. If during operation of the secondary refrigerating system moisture collects on the rear wall of the liner 342 it will be conducted down the rear wall to the bottom wall of the liner and pass through the drain pipe 410 into the drip recepticle 428. In Fig. 20 I have shown a modified form of casing 584, which is preferably constructed of plastic or glass, and offers some insulation to the flow of heat through the walls thereof. This is designed to limit the flow of heat to the ice making evaporating element positioned within the interior thereof. It may be closed on its front end by door similar to door 362. In Fig. 30 I have shown a similar refrigerating system, however, it differs from the system shown in Fig. 23 in that the refrigerant evaporating element 600 is substantially the same as evaporator shown in Figs. 1, 2 and 3 and designated 36. In this modification liquid refrigerant is delivered from condensing element 604 through a liquid supply or small diameter tube 606 to the refrigerant evaporating portion 608. The small diameter tube 606 is the sole control for the flow of liquid refrigerant to the evaporating portion 608. The evaporating portion 608 is secured to plate 610 which is clamped to a plate 614 to which a secondary condensing element 616 is secured. Thus the plate 610 and plate 614 are provided to bring the primary refrigerating system into heat exchange relationship with the condenser of the secondary system and condensing evaporated refrigerant in the secondary system. After the refrigerant leaves the evaporating portion 608 it passes to the evaporating element 600 through a fixed restriction 620. The fixed restriction maintains a pressure differential between the evaporated portion 608 and the evaporating element 600 so as to maintain a higher pressure in the element 608. The function of the condensing unit is the same as condensing unit 450.

Although only a preferred form of the invention has been illustrated, and that form described in detail, it will be apparent to those skilled in the art that various modifications may be made therein without departing from the spirit of the invention or from the scope of the appended claims.

I claim:

1. Refrigerating apparatus comprising a cabinet having a liner the inner surfaces thereof being arranged to form walls of a food storage compartment, a horizontally positioned imperforate shelf cooperating with said inner surfaces to limit the circulation of air above and below said shelf, a refrigerant evaporator positioned in said compartment above said shelf, a secondary refrigerant evaporator arranged along an outer surface of said liner for absorbing heat therethrough below said shelf, a third refrigerant evaporator on the outside of said liner and a secondary condenser secured to said third evaporator.

2. Refrigerating apparatus comprising a cabinet having a food compartment and an opening leading to said compartment, a door for closing said opening, a shelf in said compartment dividing the compartment into upper and lower portions in restricted air flow relationship, an evaporator in said upper portion for freezing ice and cooling circulating air, an evaporator positioned below said shelf for cooling said lower portion through a wall of said compartment without the collection of frost on said wall to aid in maintaining a relatively high humidity in said lower portion and a door cooperating with the front end of said shelf and the bottom wall of said food compartment to aid in retaining said relatively high humidity when said first named door is opened.

3. Refrigerating apparatus comprising a cabinet having a food compartment and an opening leading to said compartment, a door for closing said opening, a shelf in said compartment dividing the compartment into upper and lower portions, an evaporator in said upper portion for freezing ice and cooling circulating air, an evaporator positioned below said shelf for cooling said lower portion through a wall of said compartment without the collection of frost on said wall to aid in maintaining a relatively high humidity in said lower portion and a door cooperating with the front end of said shelf and the bottom wall of said food compartment to aid in retaining said relatively high humidity when said first named door is opened, said shelf being spaced slightly between its rear edge and the rear wall of said compartment to provide for limited circulation of air between said portions to limit the freezing out of moisture on the evaporator in the upper portion to thereby retain said relatively high humidity while freezing out any excess moisture.

4. Refrigerating apparatus comprising a cabinet having a food storage compartment, a refrigerant evaporating element having only its bottom wall and a portion of its rear wall exposed to circulating air in the upper portion of said compartment and heat absorbing means positioned in the lower portion of said cabinet for absorbing heat from the lower portion of said compartment and an imperforate shelf dividing said upper and lower portions of the compartment in restricted air flow relationship.

5. Refrigerating apparatus comprising a cabinet having an inner liner and an outer casing, insulation between said liner and casing, said liner forming walls of a food storage compartment, a primary refrigerating system including an ice freezing portion positioned in said food compartment and a cooling portion in said insulation, said liner having an opening in one of its walls establishing communication between said compartment and said insulation in the vicinity of said cooling portion and a secondary refrigerating system including a refrigerant evaporator positioned in said insulation in heat exchange relation with said compartment and a condenser in heat exchange relation with said cooling portion of said primary system.

6. Refrigerating apparatus comprising a cabinet having an inner liner and an outer casing, insulation between said liner and casing, said liner forming walls of a food storage compartment, a primary refrigerating system including an ice freezing portion positioned in said food storage compartment and a cooling portion in said insulation, and a secondary refrigerating system including a refrigerant evaporator positioned in said insulation in heat exchange relation with said compartment and a condenser in heat exchange relation with said cooling portion of said primary system.

7. Refrigerating apparatus comprising a primary refrigerating system including a condensing unit and two refrigerant evaporators connected in series for receiving refrigerant from said condensing unit in series circuit relation, and a secondary refrigerating system including an evaporator and a condenser with the condenser being in thermal heat exchange relation with the primary system evaporator which is the first to receive refrigerant from said condensing unit.

8. Refrigerating apparatus comprising a primary refrigerating system including a relatively large ice making refrigerant evaporator and a relatively small refrigerant evaporator connected in series circuit relationship and being arranged so that the relatively small refrigerant evaporator is the first to receive refrigerant, and a secondary refrigerating system including a refrigerant evaporator and a secondary condenser with said secondary condenser removably connected in heat exchange relation with said relatively small evaporator.

9. Refrigerating apparatus comprising a primary refrigerating system including a relatively large ice making refrigerant evaporator and a relatively small refrigerant evaporator connected in series circuit relation, with the small evaporator being arranged to receive refrigerant first, a secondary system including a condenser in thermal heat exchange relation with said relatively small evaporator, a secondary refrigerant evaporator connected to said condenser and means for promoting ebullition in said secondary evaporator.

10. Refrigerating apparatus comprising a cabinet having an inner liner forming walls of a food storage compartment, means dividing said compartment into two chambers arranged in restricted airflow relationship, a heat absorbing structure for cooling the circulating air in one of said chambers to a refrigerating temperature and for freezing out some of the moisture from said circulating air, a relatively large effective heat absorbing structure extended on the exterior of said liner for cooling the circulating air in said other chamber to a temperature lower than said refrigerating temperature by absorbing heat through walls of said liner without the collection of frost on said liner and heat dissipating means for dissipating heat absorbed by said heat absorbing structures.

11. Refrigerating apparatus comprising a cabinet having an opening, a door for closing said opening, said cabinet having an inner liner forming walls of a food storage compartment, partition means cooperating with walls of said liner to provide a high humidity chamber and a lower humidity chamber in restricted airflow relationship, means arranged to retain the air in the high humidity chamber when said door is opened, a heat absorbing structure in heat exchange relation with said lower humidity chamber for cooling circulating air therein and for freezing out some of the moisture from said circulating air, a heat absorbing structure secured to the exterior of said liner for absorbing heat therethrough without the collection of frost thereon to cool the circulating air in said high humidity chamber without freezing out moisture from said circulating air to thereby maintain a relatively higher humidity in said high humidity chamber, and heat dissipating means for dissipating heat absorbed by said heat absorbing structures.

12. Refrigerating apparatus comprising a cabinet having an inner liner forming walls of a compartment, means dividing said compartment into two chambers in restricted air flow relationship, a relatively small effective heat absorbing structure operable below the freezing point of water for cooling circulating air in one of said chambers to a refrigerating temperature, a relatively large effective heat absorbing structure secured to the exterior of said liner for cooling the circulating air in said other chamber to a temperature lower than said refrigerating temperature by absorbing heat through said liner without the collection of frost on said liner and means for dissipating heat absorbed by said structures.

13. Refrigerating apparatus comprising a cabinet having an opening, a door for closing said opening, said cabinet having an inner liner forming a compartment, partition means cooperating with walls of said liner to divide said compartment into a high humidity chamber and a low humidity chamber in restricted airflow relationship, a relatively small effective heat absorbing structure for absorbing heat from the circulating air in the low humidity chamber and for freezing out some of the moisture from said circulating air, a relatively large effective heat absorbing structure extended on exterior walls of said liner for absorbing heat from the circulating air in said high humidity chamber through walls of said liner for cooling said circulating air in said high humidity chamber to a lower temperature than the temperature of the circulating air in said low humidity chamber without the collection of frost on said liner, means cooperating with said partition means to retain the circulating air in said high humidity chamber when said door is opened and heat dissipating means for dissipating heat absorbed by said heat absorbing structures.

14. Refrigerating apparatus comprising a cabinet having an opening, a door for closing said opening, said cabinet having an inner liner forming a compartment, partition means cooperating with walls of said liner to divide said compartment into a lower high humidity chamber and an upper low humidity chamber in restricted airflow relationship, a relatively small effective heat absorbing structure for absorbing heat from the circulating air in the low humidity chamber and for freezing out some of the moisture from said circulating air, a relatively large effective heat absorbing structure extended on exterior walls of said liner for absorbing heat from the circulating air in said high humidity chamber through walls of said liner for cooling said circulating air in said high humidity chamber to a lower temperature than the temperature of the circulating air in said low humidity chamber without the collection of frost on said liner, means cooperating with said partition means to retain the circulating air in said high humidity chamber when said door is opened and heat dissipating means for dissipating heat absorbed by said heat absorbing structures.

15. In refrigerating apparatus, the combination of a cabinet structure having inner walls and means defining a first zone and a second zone to be refrigerated arranged in restricted airflow relationship, a refrigerant evaporating element positioned within said first zone whereby the air therein is lowered to a desired temperature and the moisture content thereof is reduced, a second refrigerant evaporating element having an extended portion in contact with the outer surface of said inner walls about said second zone for absorbing heat therefrom through the walls thereof, said extended portion of said second evaporating element being effective to reduce the air in said second zone to a temperature below the temperature of the air in said first zone without freezing out moisture therefrom whereby a relatively high humidity is maintained in the low temperature zone, and a single refrigerant liquefying and condensing unit for dissipating heat removed from said zones by said evaporating elements to the exterior of said cabinet.

16. In a refrigerator having two compartments, one of which is to be maintained at a high humidity and a low non-freezing temperature, and the other of which is to be maintained at low humidity and a refrigerating temperature higher than the temperature of the first named compartment, the combination comprising walls forming the two compartments in restricted airflow relationship, a first evaporator in heat exchange relation with said first named compartment, said evaporator having sufficient heat absorbing surface to maintain the aforesaid desired temperature with only a relatively small temperature gradient between the temperature of the aforesaid evaporator and the temperature to be maintained in the first named compartment, whereby only limited air circulation within said compartment is set up with a resulting minimum removal of moisture from the air, a second evaporator in heat exchange relation with the second named compartment, said second evaporator having a limited amount of heat absorbing surface effective for cooling the circulating air in said second named compartment so that a substantial temperature gradient is necessary between the temperature of said second evaporator and the temperature to be maintained in said second compartment whereby rapid air circulation in said second compartment is set up with a substantial removal of moisture from the air, and a heat dissipating unit connected with both of said evaporators for dissipating outside of said refrigerator the heat withdrawn from said compartments.

LAWRENCE A. PHILIPP.